US012075234B2

(12) United States Patent
Nishigori et al.

(10) Patent No.: US 12,075,234 B2
(45) Date of Patent: Aug. 27, 2024

(54) CONTROL APPARATUS, SIGNAL PROCESSING METHOD, AND SPEAKER APPARATUS

(71) Applicant: Sony Group Corporation, Tokyo (JP)

(72) Inventors: Shuichiro Nishigori, Tokyo (JP); Hirofumi Takeda, Kanagawa (JP); Shiro Suzuki, Kanagawa (JP); Takahiro Watanabe, Tokyo (JP)

(73) Assignee: Sony Group Corporation, Tokyo (JP)

( * ) Notice: Subject to any disclaimer, the term of this patent is extended or adjusted under 35 U.S.C. 154(b) by 132 days.

(21) Appl. No.: 17/784,056

(22) PCT Filed: Dec. 3, 2020

(86) PCT No.: PCT/JP2020/045028
§ 371 (c)(1),
(2) Date: Jun. 9, 2022

(87) PCT Pub. No.: WO2021/124906
PCT Pub. Date: Jun. 24, 2021

(65) Prior Publication Data

US 2023/0007434 A1 Jan. 5, 2023

(30) Foreign Application Priority Data

Dec. 19, 2019 (JP) ................................ 2019-228963

(51) Int. Cl.
*H04S 7/00* (2006.01)
*H04R 5/02* (2006.01)
*H04R 5/04* (2006.01)

(52) U.S. Cl.
CPC ............... *H04S 7/307* (2013.01); *H04R 5/02* (2013.01); *H04R 5/04* (2013.01); *H04R 2205/022* (2013.01); *H04R 2400/03* (2013.01)

(58) Field of Classification Search
CPC . H04R 5/02; H04R 9/025; H04R 5/04; H04R 1/02; H04R 2205/022;
(Continued)

(56) References Cited

U.S. PATENT DOCUMENTS 5,867,582 A * 2/1999 Nagayoshi ............... H04R 1/26 381/370
2019/0220095 A1 7/2019 Ogita et al.

FOREIGN PATENT DOCUMENTS

JP H07-236199 A 9/1995
JP H07-288887 A 10/1995
(Continued)

OTHER PUBLICATIONS

International Search Report and English translation thereof mailed Mar. 2, 2021 in connection with International Application No. PCT/JP2020/045028.

*Primary Examiner* — Norman Yu
(74) *Attorney, Agent, or Firm* — Wolf, Greenfield & Sacks, P.C.

(57) ABSTRACT

A control apparatus according to an embodiment of the present technology includes an audio control section and a vibration control section. The audio control section generates audio control signals of a plurality of channels with audio signals of the plurality of channels as input signals, the audio signals each including a first audio component and a second audio component different from the first audio component. The vibration control section generates a vibration control signal for vibration presentation by taking a difference between audio signals of two channels among the plurality of channels.

14 Claims, 14 Drawing Sheets

(58) Field of Classification Search
CPC ............ H04R 2499/11; H04R 2400/03; H04R 2499/15; H04S 7/307
USPC ................ 381/186, 412, 150, 345, 386, 414
See application file for complete search history.

(56) References Cited

FOREIGN PATENT DOCUMENTS

| | | | |
|---|---|---|---|
| JP | H10-200977 | A | 7/1998 |
| JP | 2001-255993 | A | 9/2001 |
| JP | 2016-202486 | A | 12/2016 |
| JP | 2017-043602 | A | 3/2017 |
| JP | 2017-050749 | A | 3/2017 |
| JP | 2018-006954 | A | 1/2018 |
| JP | 2018-064264 | A | 4/2018 |
| WO | WO 2019/072498 | A1 | 4/2019 |

* cited by examiner (A)

(B)

CONTROL APPARATUS, SIGNAL PROCESSING METHOD, AND SPEAKER APPARATUS

CROSS-REFERENCE TO RELATED APPLICATIONS

This application claims the benefit under 35 U.S.C. § 371 as a U.S. National Stage Entry of International Application No. PCT/JP2020/045028, filed in the Japanese Patent Office as a Receiving Office on Dec. 3, 2020, which claims priority to Japanese Patent Application Number JP2019-228963, filed in the Japanese Patent Office on Dec. 19, 2019, each of which is hereby incorporated by reference in its entirety.

TECHNICAL FIELD

The present technology relates to a control apparatus, a signal processing method, and a speaker apparatus.

BACKGROUND ART

In recent years, applications of stimulating the sense of touch via human skin or the like through a tactile reproduction device have been utilized in various scenes.

As tactile reproduction devices therefor, eccentric rotating mass (ERM), linear resonant actuator (LRA), and the like have been currently widely used, and devices with a resonant frequency that is a frequency (about several 100 Hz) that provides good sensitivity for the human sense of touch have been widely used for them (e.g., see Patent Literature 1).

Since the frequency band that provides high sensitivity for the human sense of touch is several 100 Hz, vibration reproduction devices that handle this band of several 100 Hz have been mainstream.

As other tactile reproduction devices, an electrostatic tactile display and a surface acoustic wave tactile display aiming at controlling a friction coefficient of a touched portion and realizing a desired tactile sense have been proposed (e.g., see Patent Literature 2). In addition, an airborne ultrasonic tactile display utilizing an acoustic radiation pressure of converged ultrasonic waves and an electrotactile display that electrically stimulates nerves and muscles that are connected to a tactile receptor have been proposed.

For applications utilizing those devices, especially for music listening, a vibration reproduction device is built in a headphone casing to reproduce vibration at the same time as music reproduction, to thereby emphasize bass sound.

Moreover, wearable (neck) speakers that do not take the form of headphones and are used hanging around a neck have been proposed. The wearable speakers include one (e.g., see Patent Literature 3) that transmits vibration to a user from the back together with sound output from the speaker by utilizing their contact with a user's body and one (e.g., see Patent Literature 4) that transmits vibration to a user by utilizing a resonance of a back pressure of speaker vibration.

CITATION LIST

Patent Literature

Patent Literature 1: Japanese Patent Application Laid-open No. 2016-202486

Patent Literature 2: Japanese Patent Application Laid-open No. 2001-255993

Patent Literature 3: Japanese Patent Application Laid-open No. HEI 10-200977

Patent Literature 4: Japanese Patent Application No. 2017-43602

DISCLOSURE OF INVENTION

Technical Problem

In headphones and wearable speakers that provide tactile presentation, in a case where a vibration signal is generated from an audio signal and presented, if a vibration signal is generated from an audio signal containing human voices in great amount, an uncomfortable or unpleasant vibration that is not desired to be provided generally may occur.

In view of the above-mentioned circumstances, the present technology provides a control apparatus, a signal processing method, and a speaker apparatus, which are capable of removing or reducing a generally uncomfortable or unpleasant vibration.

Solution to Problem

A control apparatus according to an embodiment of the present technology includes an audio control section and a vibration control section.

The audio control section generates audio control signals of a plurality of channels with audio signals of the plurality of channels as input signals, the audio signals each including a first audio component and a second audio component different from the first audio component.

The vibration control section generates a vibration control signal for vibration presentation by taking a difference between audio signals of two channels among the plurality of channels.

The vibration control section may be configured to limit a band of the audio signals of the plurality of channels or a difference signal of the audio signals of the plurality of channels to a first frequency or less.

The vibration control section may output, as the vibration control signal, a monaural signal obtained by mixing the audio signals of the respective channels for an audio signal having a frequency equal to or lower than a second frequency lower than the first frequency among the audio signals of the plurality of channels, and the difference signal for an audio signal exceeding the second frequency and being equal to or lower than the first frequency among the audio signals of the plurality of channels.

The first frequency may be 500 Hz or less.

The second cutoff frequency may be 150 Hz or less.

The first audio component may be a voice sound.

The second audio component may be a sound effect and a background sound.

The audio signals of the two channels may be audio signals of left and right channels.

The vibration control section may include an adjustment section that adjusts a gain of the vibration control signal on the basis of an external signal.

The adjustment section may be configured to be capable of switching between activation and deactivation of generation of the vibration control signal.

The vibration control section may include an addition section that generates a monaural signal obtained by mixing the audio signals of the two channels.

The vibration control section may include a subtraction section that takes a difference between the audio signals. In this case, the subtraction section is configured to be capable of adjusting a degree of reduction of the difference.

A signal processing method according to an embodiment of the present technology includes: generating audio control signals of a plurality of channels with audio signals of the plurality of channels as input signals, the audio signals each including a first audio component and a second audio component different from the first audio component; and generating a vibration control signal for vibration presentation by taking a difference between audio signals of two channels among the plurality of channels.

A speaker apparatus according to an embodiment of the present technology includes an audio output unit, a vibration output unit, an audio control section, and a vibration control section.

The audio control section generates audio control signals of a plurality of channels with audio signals of the plurality of channels as input signals, the audio signals each including a first audio component and a second audio component different from the first audio component, and drives the audio output unit.

The vibration control section generates a vibration control signal for vibration presentation by taking a difference between audio signals of two channels among the plurality of channels, and drives the vibration output unit.

MODE(S) FOR CARRYING OUT THE INVENTION

Embodiments according to the present technology will be described below with reference to the drawings.

First Embodiment (Basic Configuration of Speaker Apparatus)

Figure 1:
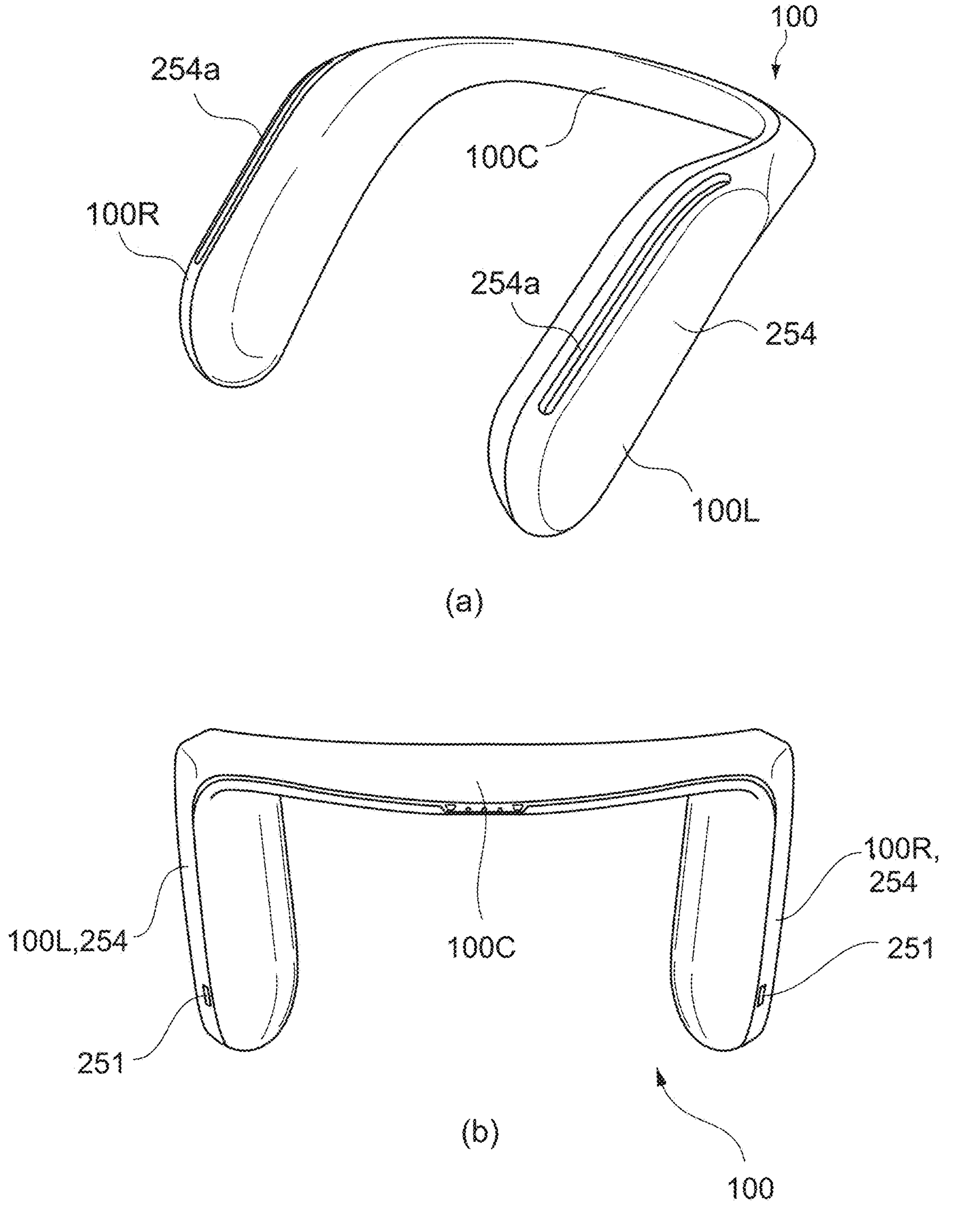
FIG. 1 shows a perspective view and a bottom view of a speaker apparatus according to a first embodiment of the present technology.
Figure 2:
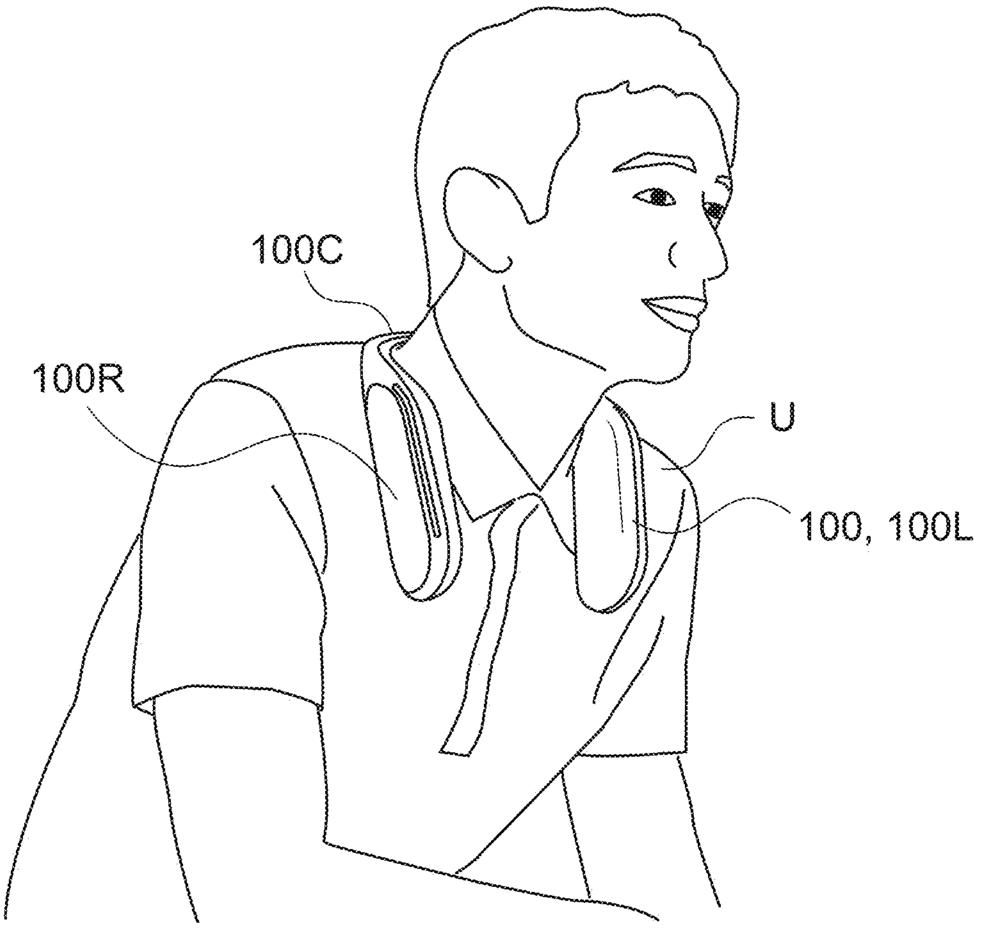
FIG. 2 is a perspective view showing a state in which the speaker apparatus is mounted on a user.

FIG. 1 shows a perspective view (a) and a bottom view (b) showing a configuration example of a speaker apparatus in an embodiment of the present technology. This speaker apparatus (sound output apparatus) 100 has a function of actively presenting vibration (tactile sense) to a user U at the same time as presenting sound. As shown in FIG. 2, the speaker apparatus 100 is, for example, a wearable speaker that is mounted on both shoulders of the user U.

The speaker apparatus 100 includes a right speaker 100R, a left speaker 100L, and a coupler 100C that couples the right speaker 100R with the left speaker 100L. The coupler 100C is formed in an arbitrary shape capable of hanging around the neck of the user U, and the right speaker 100R and the left speaker 100L are positioned on both shoulders or upper portions of the chest of the user U.

Figure 3:
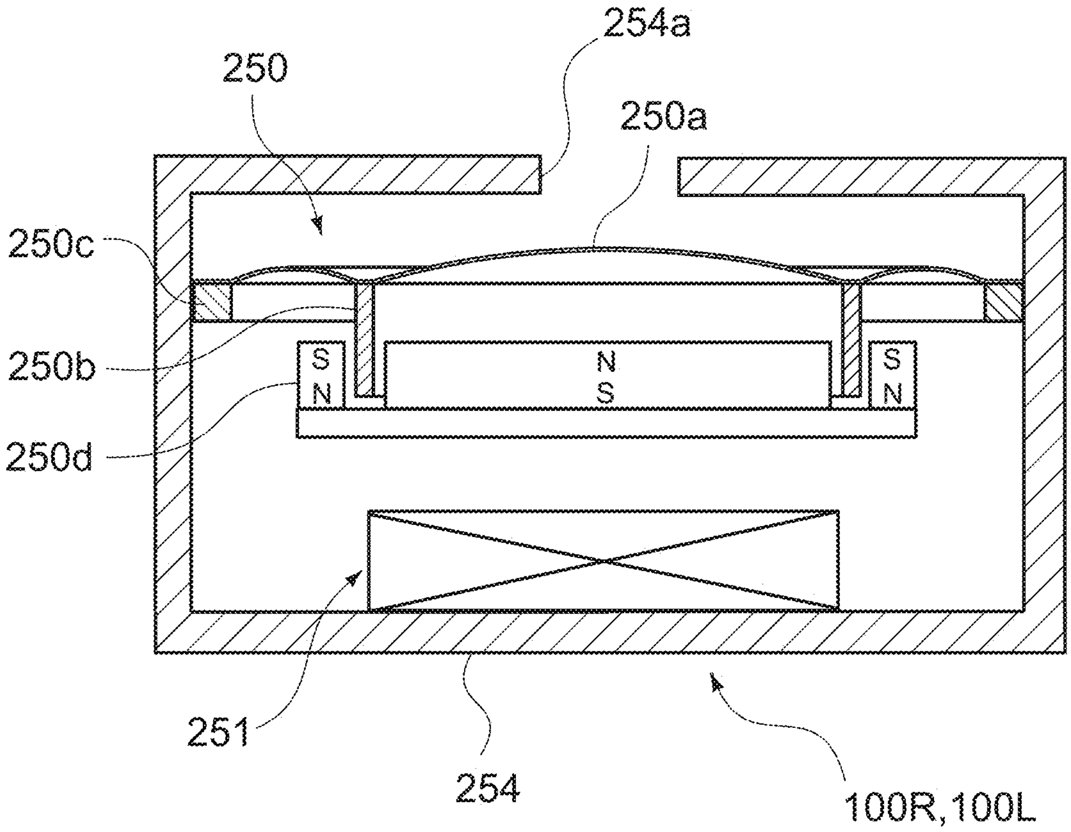
FIG. 3 is a schematic cross-sectional view of main parts of the speaker apparatus.

FIG. 3 is a schematic cross-sectional view of main parts of the right speaker 100R and the left speaker 100L of the speaker apparatus 100 in FIGS. 1 and 2. The right speaker 100R and the left speaker 100L typically have a left-right symmetric structure. It should be noted that FIG. 3 is merely a schematic view, and therefore it is not necessarily equivalent to the shape and dimension ratio of the speaker shown in FIGS. 1 and 2.

The right speaker 100R and the left speaker 100L include, for example, audio output units 250, vibration presentation units 251, and casings 254 that house them. The right speaker 100R and the left speaker 100L typically reproduce audio signals by a stereo method. Reproduction sound is not particularly limited as long as it is reproducible sound or voice that is typically a musical piece, a conversation, a sound effect, or the like.

The audio output units 250 are electroacoustic conversion-type dynamic speakers. The audio output unit 250 includes a diaphragm 250*a*, a voice coil 250*b* wound around the center portion of the diaphragm 250*a*, a fixation ring 250c that retains the diaphragm 250*a* to the casing 254, and a magnet assembly 250*d* disposed facing the diaphragm 250*a*. The voice coil 250*b* is disposed perpendicular to a direction of a magnetic flux produced in the magnet assembly 250*d*. When an audio signal (alternate current) is supplied into the voice coil 250*b*, the diaphragm 250*a* vibrates due to electromagnetic force that acts on the voice coil 250*b*. By the diaphragm 250*a* vibrating in accordance with the signal waveform of the audio signal, reproduction sound waves are generated.

The vibration presentation unit 251 includes a vibration device (vibrator) capable of generating tactile vibration, such as an eccentric rotating mass (ERM), a linear resonant actuator (LRA), or a piezoelectric element. The vibration presentation unit 251 is driven when a vibration signal for tactile presentation prepared in addition to a reproduction signal is input. The amplitude and frequency of the vibration are also not particularly limited. The vibration presentation unit 251 is not limited to a case where it is constituted by the single vibration device, and the vibration presentation unit 251 may be constituted by a plurality of vibration devices. In this case, the plurality of vibration devices may be driven at the same time or may be driven individually.

The casing 254 has an opening potion (sound input port) 254*a* for passing audio output (reproduction sound) to the outside, in a surface opposite to the diaphragm 250*a* of the audio output unit 250. The opening potion 254*a* is formed in a straight line shape to conform to a longitudinal direction of the casing 254 as shown in FIG. 1, though not limited thereto. The opening potion 254*a* may be constituted by a plurality of through-holes or the like.

The vibration presentation unit 251 is, for example, disposed on an inner surface on a side opposite to the opening potion 254*a* of the casing 254. The vibration presentation unit 251 presents tactile vibration to the user via the casing 254. In order to improve the transmissivity of tactile vibration, the casing 254 may be partially constituted by a relatively low rigidity material. The shape of the casing 254 is not limited to the shape shown in the figure, and an appropriate shape such as a disk-shape or a rectangular parallelepiped-shape can be employed.

Figure 4:
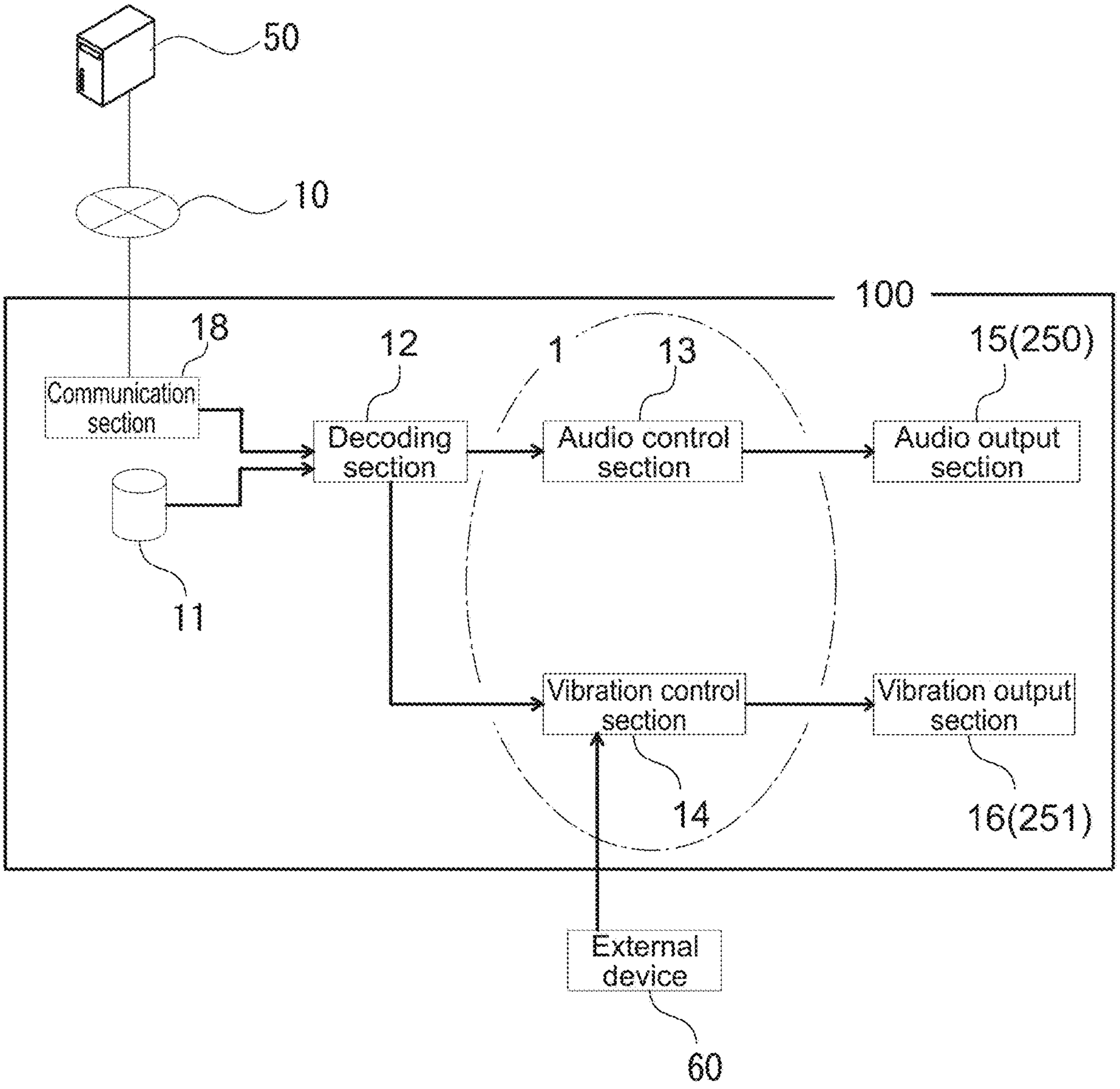
FIG. 4 is a block diagram showing a configuration example of the speaker apparatus.

Next, a control system of the speaker apparatus 100 will be described. FIG. 4 is a block diagram showing a configuration example of the speaker apparatus applied in this embodiment.

The speaker apparatus 100 includes a control apparatus 1 that controls driving of the audio output units 250 and the vibration presentation units 251 of the right speaker 100R and the left speaker 100L. The control apparatus 1 and other elements to be described later are built in the casing 254 of the right speaker 100R or the left speaker 100L.

An external device 60 is an external device such as a smartphone or a remote controller, which will be described later in detail, and operation information such as a switch or a button by a user is wirelessly transmitted and input to the control apparatus 1 (which will be described later).

As shown in FIG. 3, the control apparatus 1 includes an audio control section 13 and a vibration control section 14.

The control apparatus 1 can be provided by hardware components used in a computer, such as a central processing unit (CPU), a random access memory (RAM), and a read only memory (ROM), and necessary software. Instead of or in addition to the CPU, a programmable logic device (PLD) such as a field programmable gate array (FPGA), or a digital signal processor (DSP), other application specific integrated circuit (ASIC), and the like may be used. The control apparatus 1 executes a predetermined program, so that the audio control section 13 and the vibration control section 14 are configured as functional blocks.

The speaker apparatus 100 includes storage (storage section) 11, a decoding section 12, an audio output section 15, a vibration output section 16, and a communication section 18 as other hardware.

On the basis of a musical piece or other audio signal as an input signal, the audio control section 13 generates an audio control signal for driving the audio output section 15. The audio signal is data for sound reproduction (audio data) stored in the storage 11 or a server device 50.

The vibration control section 14 generates a vibration control signal for driving the vibration output section 16 on the basis of a vibration signal. The vibration signal is generated utilizing the audio signal, as will be described below.

The storage 11 is a storage device capable of storing an audio signal, such as a nonvolatile semiconductor memory. In this embodiment, the audio signal is stored in the storage 11 as digital data encoded as appropriate.

The decoding section 12 decodes the audio signal stored in the storage 11. The decoding section 12 may be omitted as necessary or may be configured as a functional block that forms a part of the control apparatus 1.

The communication section 18 is constituted by a communication module connectable to a network 10 with a wire (e.g., USB cable) or wirelessly by Wi-Fi, Bluetooth (registered trademark), or the like. The communication section 18 is configured as a receiving section capable of communicating with the server device 50 via the network 10 and capable of acquiring the audio signal stored in the server device 50.

The audio output section 15 includes the audio output units 250 of the right speaker 100R and the left speaker 100L shown in FIG. 3, for example.

The vibration output section 16 includes the vibration presentation units 251 shown in FIG. 3, for example.

(Typical Operation of Speaker Apparatus)

Next, a typical operation of the speaker apparatus 100 configured in the above-mentioned manner will be described.

The control apparatus 1 generates signals (audio control signal and vibration control signal) for driving the audio output section 15 and the vibration output section 16 by receiving the signals from the server device 50 or reading the signals from the storage 11.

Next, the decoding section 12 performs suitable decoding processing on the acquired data to thereby take out audio data (audio signal), and inputs the audio data to the audio control section 13 and the vibration control section 14, respectively.

The audio data format may be a linear PCM format of raw data or may be a data format that is highly efficiently encoded by an audio codec, such as MP3 or AAC.

The audio control section 13 and the vibration control section 14 perform various types of processing on the input data. Output (audio control signal) of the audio control section 13 is input into the audio output section 15, and output (vibration control signal) of the vibration control section 14 is input into the vibration output section 16. The audio output section 15 and the vibration output section 16 each include a D/A converter, a signal amplifier, and a reproduction device (equivalent to the audio output units 250 and the vibration presentation units 251).

The D/A converter and the signal amplifier may be included in the audio control section 13 and the vibration control section 14. The signal amplifier may include a volume adjustment section that is adjusted by the user U, an equalization adjustment section, a vibration amount adjustment section by gain adjustment, and the like.

On the basis of the input audio data, the audio control section 13 generates an audio control signal for driving the audio output section 15. On the basis of the input tactile data, the vibration control section 14 generates a vibration control signal for driving the vibration output section 16.

Here, if a wearable speaker is used, since a vibration signal is rarely prepared separately from an audio signal in broadcast content, package content, net content, game content, and the like, sound with high correlation with vibration is generally utilized. In other words, processing is performed on the basis of an audio signal, and the generated vibration signal is output.

When such vibration is presented, the user may feel it as a generally unfavorable vibration. For example, when quotes and narrations in content such as movies, dramas, animation, and games, live sounds in sports videos, and the like are presented as vibration, the user feels like the body is shaken by the voices of other people and often feels uncomfortable.

In addition, since those audio components have a relatively large sound volume, and their center frequency band is also within the vibration presentation frequency range (several 100 Hz), they will provide larger vibration than other vibration components and will mask the components of shocks, rhythms, feel, and the like, by which vibration is originally desired to be provided.

On the other hand, if the content in which an audio signal and a vibration signal are individually prepared is reproduced, the vibration that provides the user with a sense of discomfort or an unpleasant feeling should not be presented, because a content creator creates the vibration signal with the creator's intention in advance. However, since the preference of human senses differs among individuals, there is a possibility that an uncomfortable or unpleasant vibration may be presented in some cases.

In the active vibration wearable speaker, the control apparatus 1 of this embodiment is configured as follows in order to remove or reduce an uncomfortable or unpleasant vibration for the user.

(Control Apparatus)

The control apparatus 1 includes the audio control section 13 and the vibration control section 14 as described above. The audio control section 13 and the vibration control section 14 are configured to have the functions to be described below in addition to the functions described above.

The audio control section 13 generates an audio control signal for each of a plurality of channels with audio signals of the plurality of channels each including a first audio component and a second audio component different from the first audio component as input signals. The audio control signal is a control signal for driving the audio output section 15.

The first audio component is typically a voice sound. The second audio component is another audio component other than the voice sound, for example, a sound effect or a background sound. The second audio component may be both the sound effect and the background sound or may be either one of them.

In this embodiment, the plurality of channels are two channels of a left channel and a right channel. The number of channels is not limited to two of the left and right channels and may be three or more channels in which a center, a rear, a subwoofer, and the like are added to the above two channels.

The vibration control section 14 generates a vibration control signal for vibration presentation by taking the difference of the audio signals of the two channels among the plurality of channels. The vibration control signal is a control signal for driving the vibration output section 16.

As will be described later, for the voice sound, the same signal is usually used in the left and right channels, and the above-mentioned difference processing is performed to obtain a vibration control signal in which the voice sound is canceled. This makes it possible to generate a vibration control signal based on an audio signal other than the voice sound, such as a sound effect or a background sound.

Figure 5:
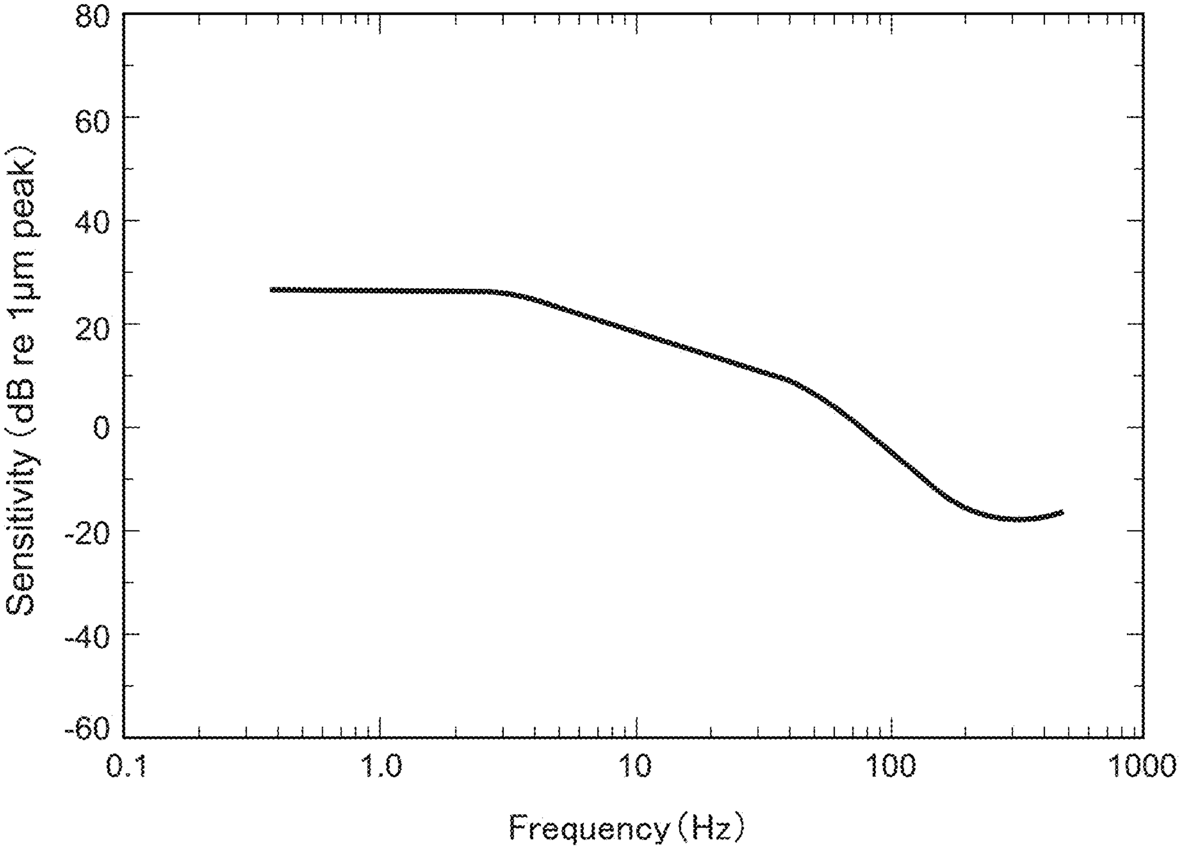
FIG. 5 is a graph showing a vibration detection threshold as a mechanism of the human sense of touch.

On the other hand, as a human tactile sense mechanism, a vibration detection threshold as shown in FIG. 5 is known (cited from "Four cahnnels mediate the mechanical aspects of touch", S. J. Bolanowski 1988). Centering on the frequencies between 200 and 300 Hz, at which a human is most sensitive to vibration, sensitivity becomes duller as being away from this frequency band. Typically, the range of several Hz to 1 kHz is considered to be the vibration presentation range. In reality, however, frequencies of 500 Hz or more affect the sense of hearing and is regarded as noise, and thus the upper limit is set to approximately 500 Hz.

Figure 6:
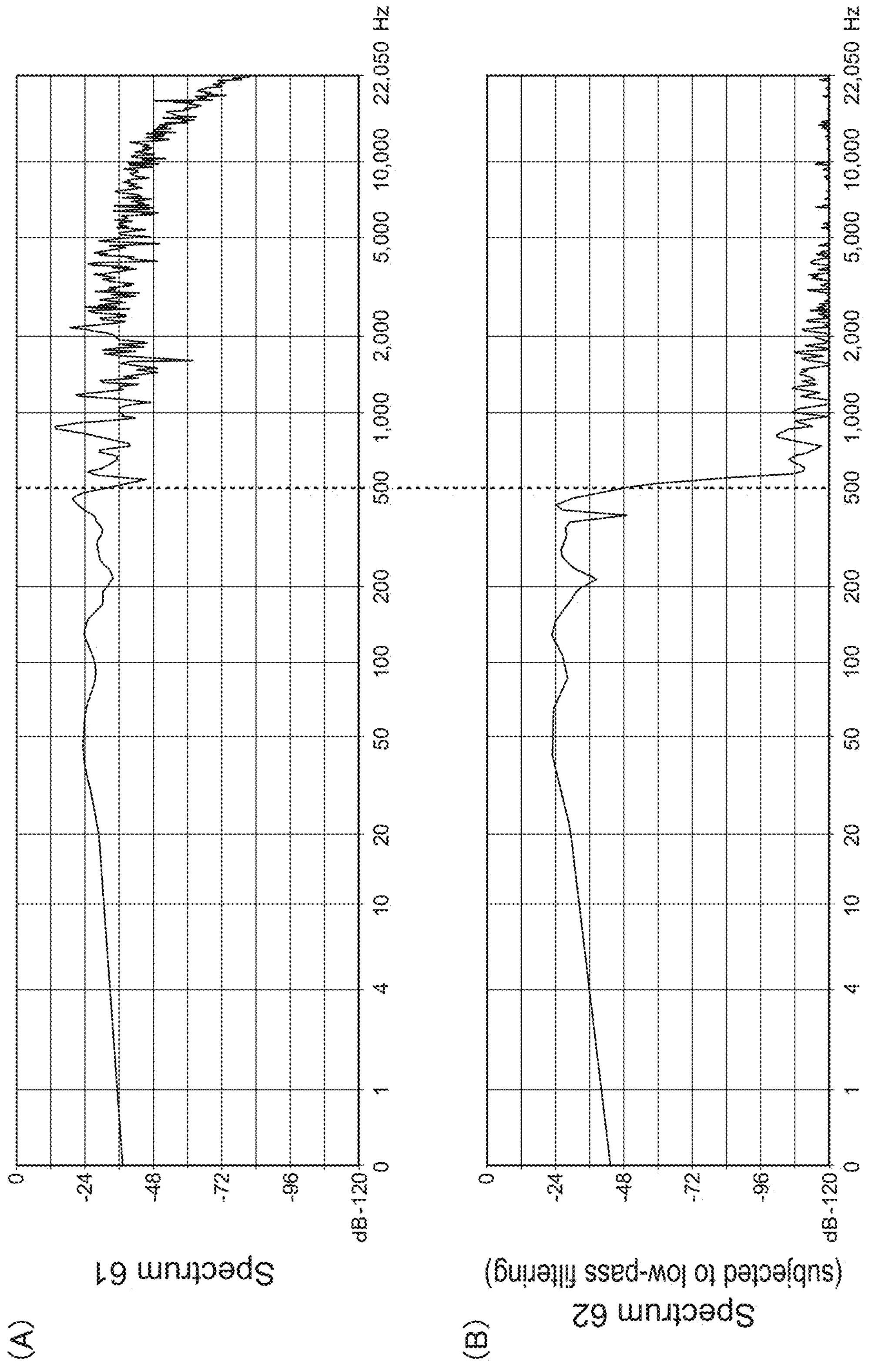
FIG. 6 shows graphs of signals in which low-pass filtering is performed on the spectrum of an audio signal.

In this embodiment, the vibration control section 14 has a low-pass filter function of limiting the band of the audio signal to a predetermined frequency (first frequency) or less. (A) of FIG. 6 shows a spectrum (logarithmic spectrum) 61 of the audio signal, and (B) of FIG. 6 shows a spectrum 62 subjected to low-pass filtering (e.g., cutoff frequency of 500 Hz) performed on the spectrum 61. The vibration control section 14 generates a vibration signal using the audio signal (spectrum 62) obtained after the low-pass filtering. The first frequency is not limited to 500 Hz, but it may be a lower frequency than 500 Hz.

Regarding the number of channels of the vibration signal, the signals obtained by limiting the bands of the left and right audio signals may be output as vibration signals of the two channels as they are. However, if different vibrations are presented on the left side and right side, the user may feel a sense of discomfort. In this embodiment, a monaural signal obtained by mixing the left and right channels is output as the same vibration signal on the left side and right side. Such mixed monaural signal is calculated as an average value of the audio signals of the left and right channels, for example, as shown in the following (Equation 1).

$$VM(t)=(AL(t)+AR(t))\times 0.5 \qquad \text{(Equation 1)}$$

Here, VM(t) is a value at a time t in the vibration signal, AL(t) is a value at the time t of the left channel of the band-limited audio signal, and AR(t) is a value at the time t of the right channel of the band-limited audio signal.

The above-mentioned configuration of the speaker apparatus 100 makes it possible to reproduce sound and vibration with respect to existing content. In this embodiment, the signal processing using (Equation 1) is performed on the digital audio signals corresponding to the two channels of the existing content in the vibration control section 14 of FIG. 4, and thus it is possible to remove or reduce the noise caused by quotes, narrations, live broadcasting, and the like.

Incidentally, it is considered that the elements constituting a stereo audio signal of two channels in general content include, as three major elements, a voice sound such as quotes and narrations, a sound effect for representation, and a background sound such as music and environmental sounds.

(Content sound=Voice sound+Sound effect+Background sound)

The content creator generates final content by adjusting the sound quality and volume of each constitutional element and then perform mixing. At that time, in consideration of the sense of sound localization (direction of sound arrival), the voice is usually assigned as the same signal in the left and right channels such that the voice can be constantly heard from a stable position (front) as the foreground. The sound effect and the background sound are usually assigned as different signals in the left and right channels in order to enhance the sense of realism.

Figure 14:
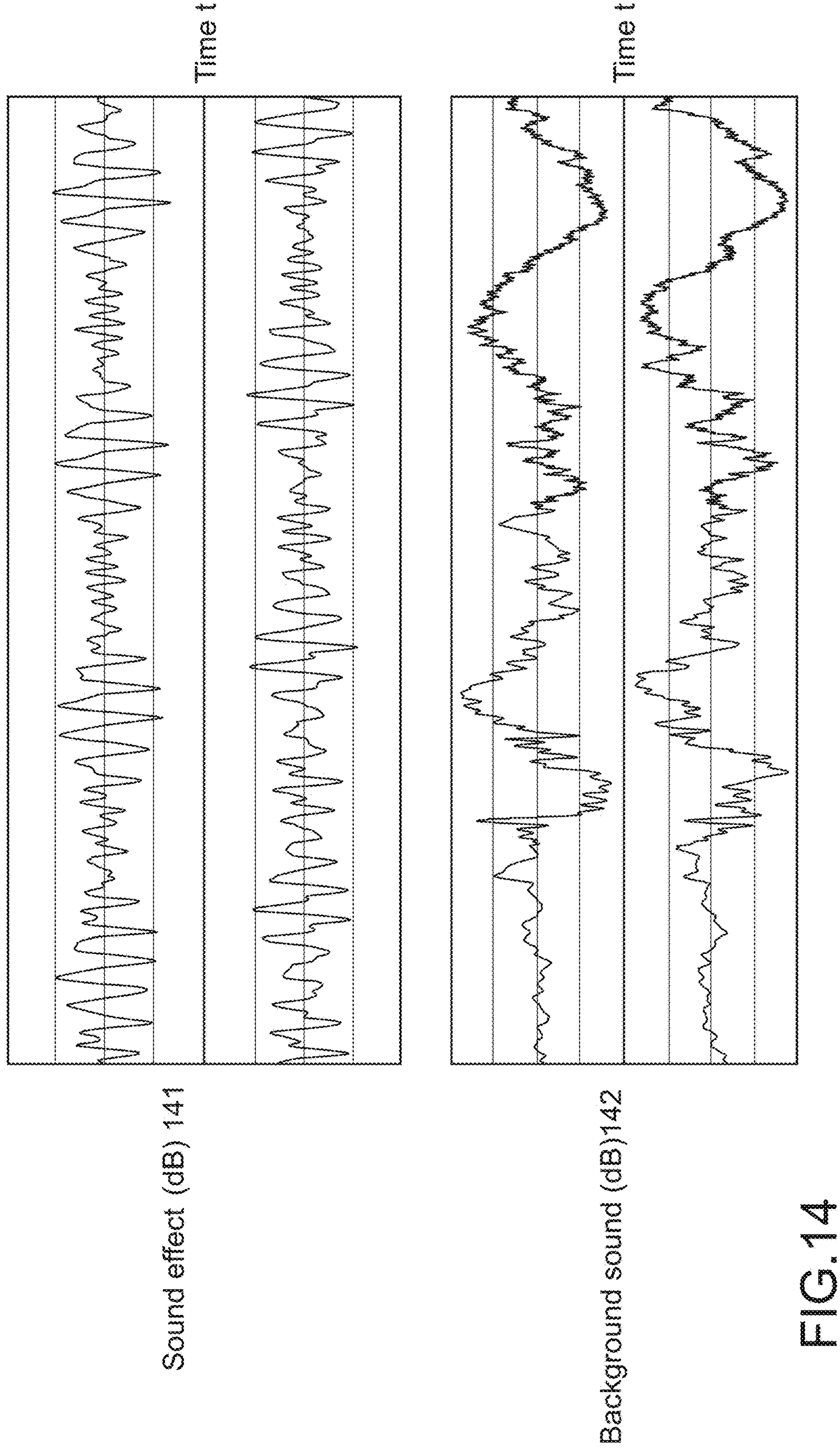
FIG. 14 is a graph showing signal examples of a sound effect and a background sound.

FIG. 14 is a graph showing signal examples of a sound effect 141 (e.g., chime sound) and a background sound 142 (e.g., musical piece). Each signal has left channel data (upper stage) and right channel data (lower stage).

It is found that both the sound effect 141 and the background sound 142 have signals that are similar in shape in the left and right channels but are different.

The two-channel sound mixing is shown in (Equation 2) and (Equation 3). Here, AL(t) is a value at a time t in the left channel of the audio signal, AR(t) is a value at the time t of the right channel of the audio signal, S(t) is a value at the time t of a voice signal, EL(t) is a value at the time t of the left channel of a sound effect signal, ER(t) is a value at the time t of the right channel of the sound effect signal, ML(t) is a value at the time t of the left channel of a background sound signal, and MR(t) is a value at the time t of the right channel of the background sound signal.

$$AL(t)=S(t)+EL(t)+ML(t) \quad \text{(Equation 2)}$$

$$AR(t)=S(t)+ER(t)+MR(t) \quad \text{(Equation 3)}$$

Here, the signal subjected to the difference processing of the left and right channels in the audio signal as in the following (Equation 4) is used as a vibration signal VM(t), and thus S(t) is canceled. As a result, vibration is not provided in response to the audio signals of quotes, narrations, live broadcasting, and the like, and an unpleasant vibration is removed.

$$VM(t)=AL(t)-AR(t)=EL(t)-ER(t)+ML(t)-MR(t) \quad \text{(Equation 4)}$$

Note that (Equation 4) may be AR(t)−AL(t).

As described above, the vibration control section 14 is not limited to the following case where the audio signals of the left and right channels are band-limited, the band-limited audio signals of the left and right channels are subjected to the difference processing, and the audio signal subjected to the difference processing is output as a vibration control signal. For example, as shown in FIG. 7, the vibration control section 14 may perform difference processing on the audio signals of the left and right channels, and perform band-limiting processing on the audio signal (difference signal) subjected to the difference processing, thus outputting the band-limited difference signal as a vibration control signal.

Figure 7:
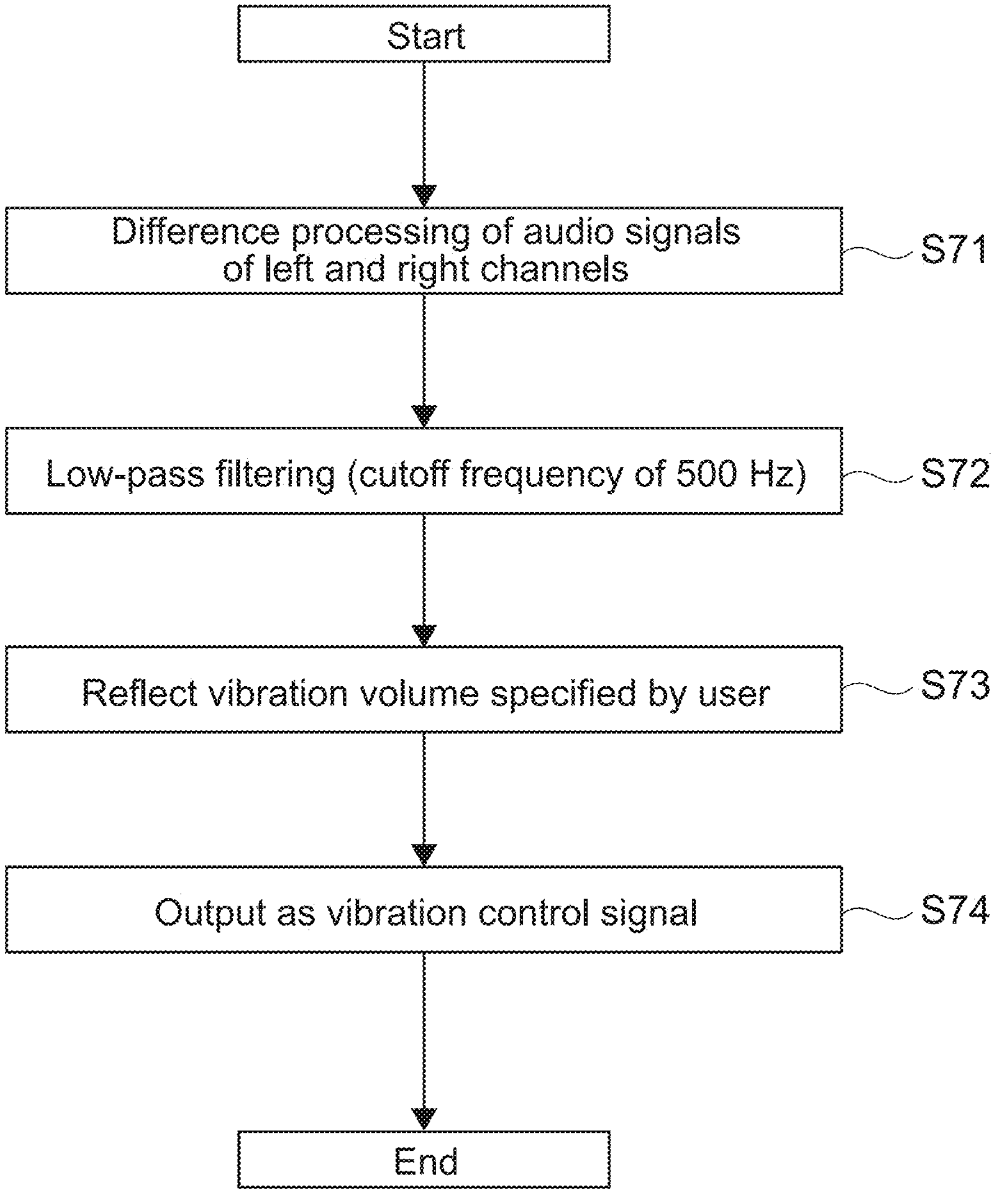
FIG. 7 is a flowchart for generating a vibration signal from an audio signal in a first embodiment of the present technology.

FIG. 7 is a flowchart showing another example of the procedure for generating a vibration signal from an audio signal, which is executed in the vibration control section 14.

In Step S71, with the audio signal, which has been output from the decoding section 12 of FIG. 4, being used as an input, the difference signal of the audio signals of the left and right channels is obtained according to (Equation 4) described above.

Subsequently, in Step 72, similarly to FIG. 6, low-pass filtering at a cutoff frequency of a predetermined frequency (e.g., 500 Hz) or less is performed on the difference signal obtained in Step S71, and thus a band-limited audio signal is obtained.

Subsequently, in Step 73, the band-limited signal obtained in Step S72 is multiplied by a gain coefficient corresponding to the vibration volume specified by the user with an external UI or the like.

Subsequently, in Step 74, the signal obtained in Step S73 is output as a vibration control signal to the vibration output section 16.

Depending on the mixing method by the content creator, it is conceivable that the voice is subjected to effects such as reverberation and compressor to give an effect of emphasis. In such a case, different signals are assigned to the left and right channels, and even in this case, the main component of the voice is assigned as the same signal to the left and right channels. Thus, an uncomfortable or unpleasant vibration due to the voice is further reduced by the difference signal (Equation 4) as compared with the normal signal.

Meanwhile, for VM(t), a signal from which the signal (central localization component) with the same magnitude is removed at the same time in both the left and right channels is obtained by (Equation 4) described above, but a signal with the same magnitude is included at the same time in each term of EL(t), ER(t), ML(t), and MR(t) in (Equation 2) and (Equation 3).

In other words, when the processing of (Equation 4) is performed, the following negative effects may occur in which a signal, by which vibration is originally desired to be provided, is impaired and no vibration is provided. Further, since VM(t) in (Equation 4) is a difference result, the magnitude of the signal may become smaller than that of the original signal if the correlation between the original signals is high.

Figure 8:
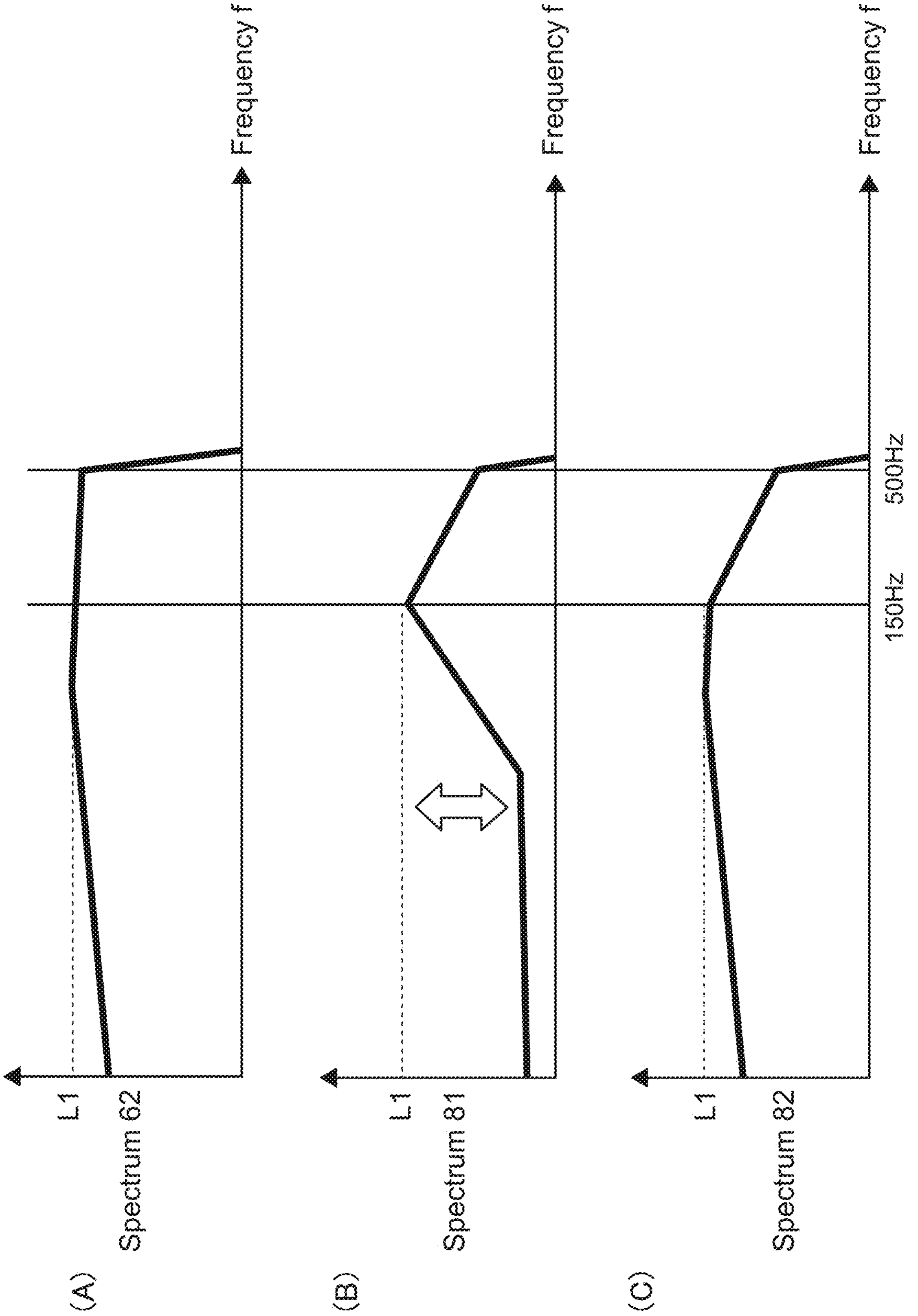
FIG. 8 shows graphs showing the spectrum before difference processing is performed, the spectrum after the difference processing is performed, and the spectrum after the difference processing is performed while leaving the low frequency.

For example, (A) of FIG. 8 shows a mixed monaural signal ((L+R)×0.5) of the audio signals of the left and right channels before the difference processing (which corresponds to the spectrum 62 in FIG. 6), and (B) of FIG. 8 shows a spectrum (L-R) 81 of the audio signal after the difference processing, respectively. In the spectrum 81 obtained after the difference processing, the overall level falls from the maximum value L1 of the spectrum 62 (e.g., −24 dB). Further, signals below 150 Hz are impaired.

So, the band at the lower limit frequency (e.g., 150 Hz) or less of the voice (human voice) is excluded from the target of the difference processing and then subjected to addition processing of the left and right signals of (Equation 1). The band exceeding the lower limit frequency is removed by the difference processing. Thus, it is possible to maintain the low-frequency signal component, by which vibration is desired to be provided, as shown in (C) of FIG. 8.

In other words, the vibration control section 14 outputs a monaural signal obtained by mixing the audio signals of the respective channels, as a vibration control signal, for the audio signal having a frequency equal to or lower than the second frequency (150 Hz in this example) lower than the first frequency (500 Hz in this example), and outputs the difference signal of those audio signals, as a vibration control signal, for the audio signal having a frequency exceeding the second frequency and being equal to or lower than the first frequency, among the audio signals of the plurality of channels.

Note that the values of the first frequency and the second frequency are not limited to the above example and can be arbitrarily set.

Figure 9:
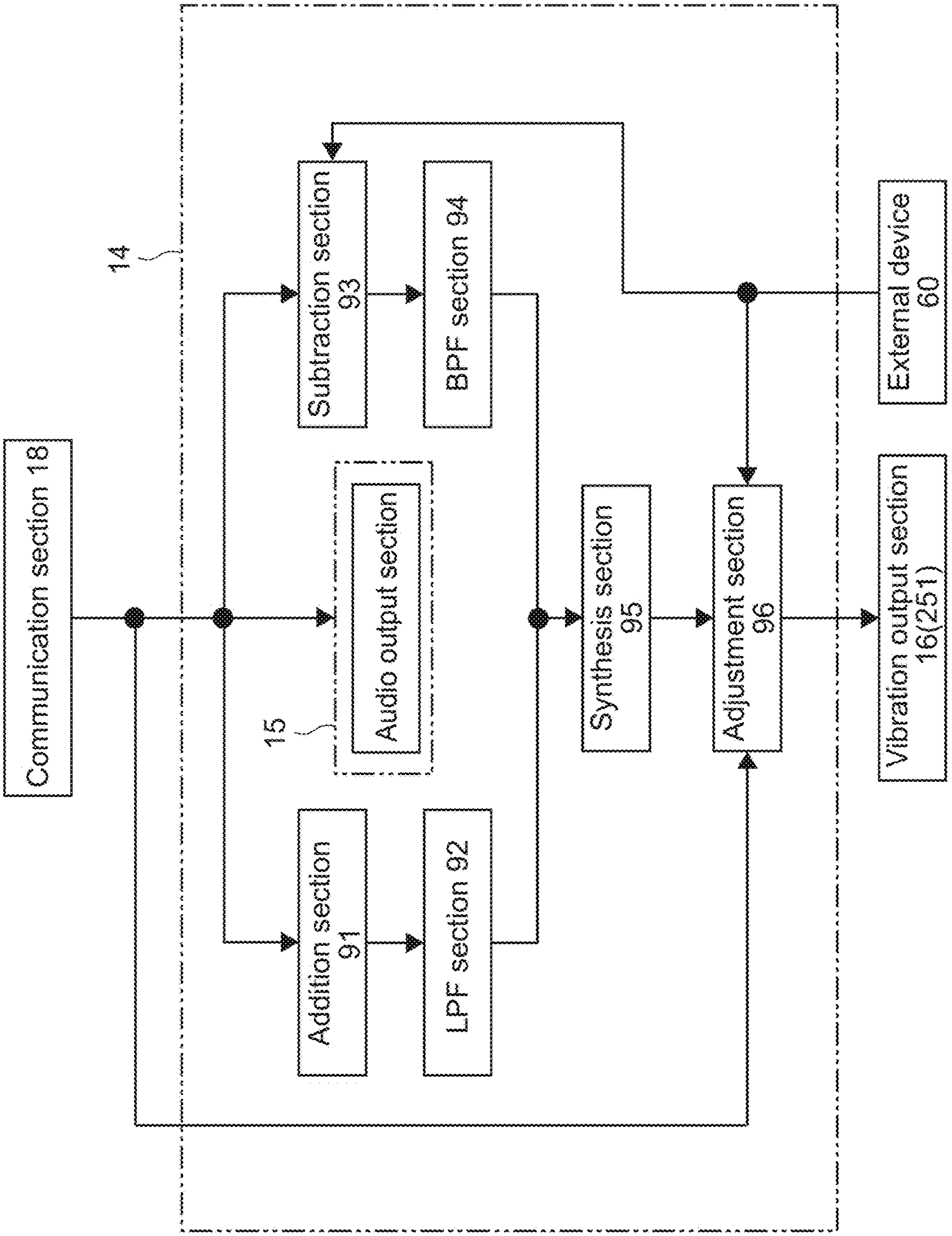
FIG. 9 is a block diagram showing the internal configuration of the vibration control section of the speaker apparatus in this embodiment.

FIG. 9 is a block diagram showing an example of the internal configuration of the vibration control section 14 of the speaker apparatus 100 in this embodiment.

The vibration control section 14 includes an addition section 91, an LPF section 92, a subtraction section 93, a BPF section 94, a synthesis section 95, and an adjustment section 96.

The addition section 91 downmixes the audio signals of the two channels received via the communication section 18 to a monaural signal according to (Equation 1).

The LPF section 92 performs low-pass filtering at a cutoff frequency of 150 Hz to convert the main component of the audio signal into a signal having a band of 150 Hz or less.

The subtraction section 93 performs difference processing on the audio signals of the two channels received via the communication section 18 according to (Equation 4).

The BPF section 94 converts the main component of the audio signal into a signal of 150 Hz to 500 Hz by bandpass filtering with a passband of 150 Hz to 500 Hz.

The synthesis section 95 synthesizes the signal input from the LPF section 92 and the signal input from the BPF section 94.

The adjustment section 96 is for adjusting the gain of the entire vibration control signal when adjusting the volume of vibration through an input operation or the like from the external device 60. The adjustment section 96 outputs the gain-adjusted vibration control signal to the vibration output section 16.

The adjustment section 96 may further be configured to be capable of switching between the activation and deactivation of the generation of the vibration control signal, which is performed in the addition processing by the addition section 91, the band-limiting processing by the LPF section 92 or BPF section 94, and the subtraction processing by the subtraction section 93. In the case of the processing in which the generation of the vibration control signal is not performed (hereinafter, also referred to as generation deactivation processing), the audio signal of each channel is directly input to the adjustment section 96, and a vibration control signal is generated.

Whether or not to adopt the generation deactivation processing can be arbitrarily set by the user. Typically, a control command of the generation deactivation processing is input to the adjustment section 96 via the external device 60.

Note that, as will be described later, the subtraction section 93 may also be configured to be capable of adjusting the degree of reduction when taking the difference of the audio signals of the left and right channels, via the external device 60. In other words, the present technology is not limited to the case where all the generation of the vibration control signal derived from the voice sound is excluded, and the magnitude of the vibration derived from the voice sound may be configured to be arbitrarily settable according to the preference of the user.

As the method of adjusting the degree of reduction, for example, a difference signal between the left-channel audio signal of the two channels and the right-channel audio signal, which is multiplied by a coefficient, is used as a vibration control signal. The coefficient can be arbitrarily set, and the audio signal multiplied by the coefficient may also be the left-channel audio signal instead of the right-channel audio signal.

Figure 10:
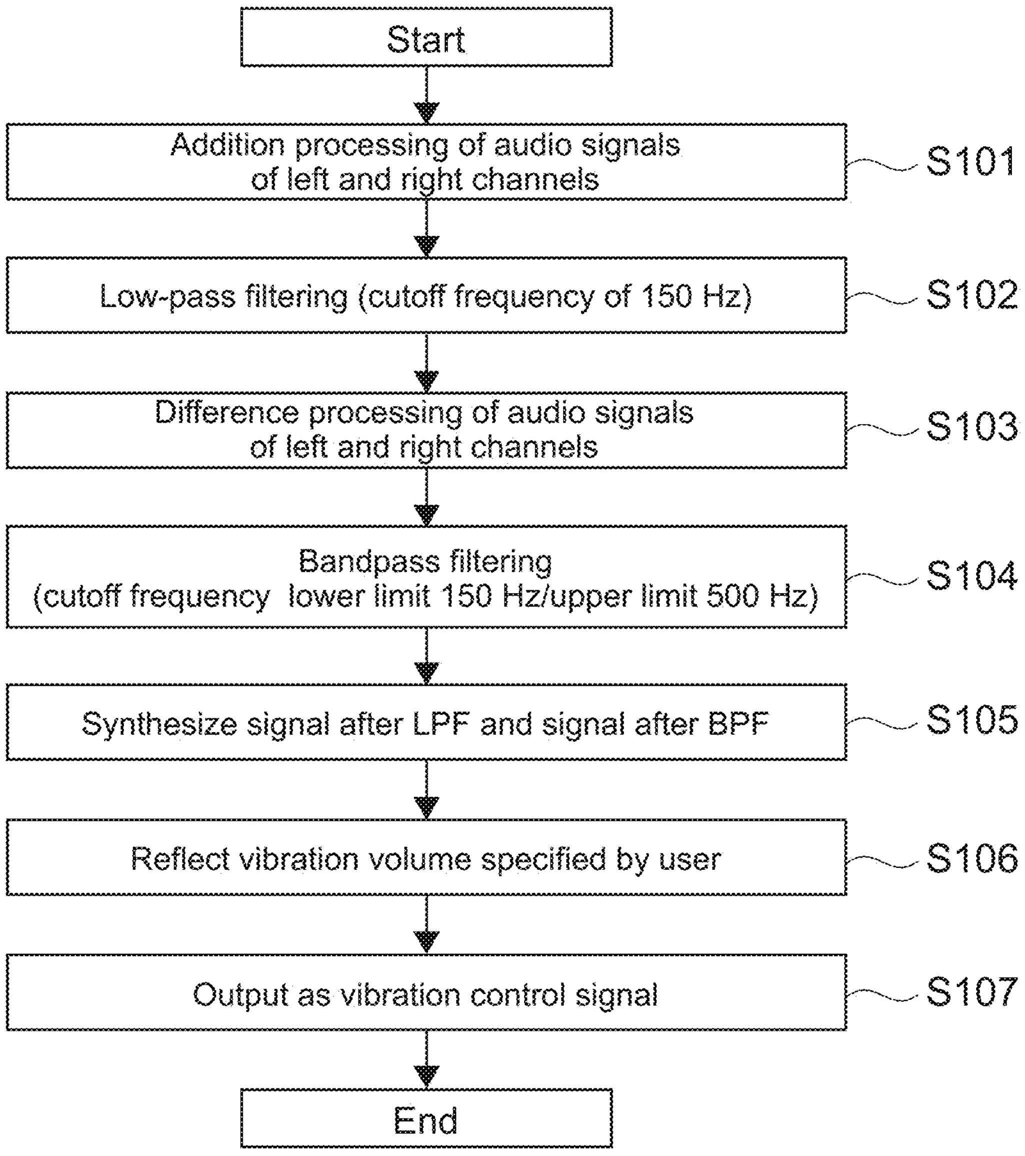
FIG. 10 is a flowchart for generating a vibration signal from an audio signal in the first embodiment of the present technology.

FIG. 10 is a flowchart relating to a series of processing for generating the vibration signal from the audio signal in this embodiment.

In Step S101, the addition section 91 performs addition processing of the left and right signals of (Equation 1). Subsequently, in Step S102, the LPF section 92 performs low-pass filtering at a cutoff frequency of 150 Hz on the signal obtained after the addition processing.

Subsequently, in Step S103, the subtraction section 93 performs difference processing of the left and right signals of (Equation 4). At that time, a voice reduction coefficient (to be described later) adjusted by the user, which is input from the external device 60, may be considered.

Subsequently, in Step S104, the BPF section 94 performs bandpass filtering at cutoff lower limit frequency of 150 Hz and upper limit frequency of 500 Hz, on the signal obtained after the difference processing. The cutoff upper limit frequency is appropriately selected in the same manner as in the lower limit frequency.

Subsequently, in Step S105, the synthesis section 95 performs synthesizing processing of the signal after the processing in Step S102 and the signal after the processing in Step 104.

Subsequently, in Step S106, a signal, which is obtained by multiplying the signal obtained after the processing of Step S105 by a vibration gain coefficient set by the user with an external user interface (UI) or the like, is obtained by the adjustment section 96. Subsequently, in Step S107, the signal obtained after the processing of Step S106 is output as a vibration control signal to the vibration output section 16 or 251.

As described above, according to this embodiment, it is possible to remove or reduce a vibration component providing a sense of discomfort or an unpleasant feeling for a user when the vibration signal is generated from the received audio signal.

Second Embodiment

For example, in disc standards of DVDs, Blue-Ray, and the like, digital broadcasting systems, game content, and the like, audio signals of 5.1 channel or 7.1 channel are used as multi-channel audio formats.

Figure 11:
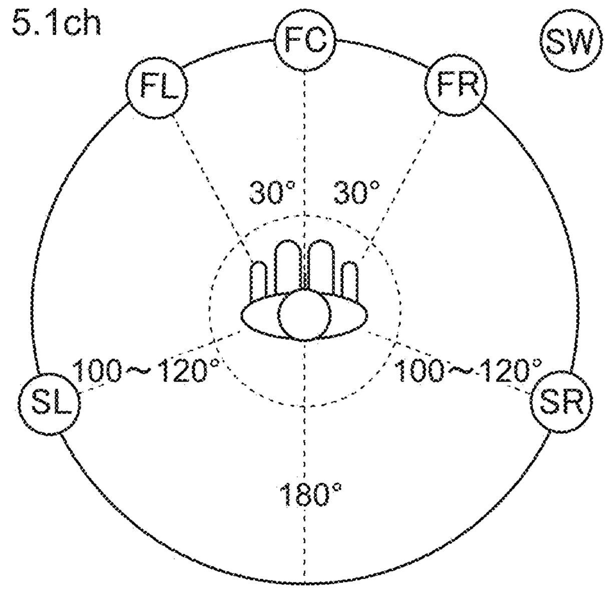
FIG. 11 shows top views showing a speaker arrangement in audio signal formats of 5.1 channels and 7.1 channels.
Figure 11:
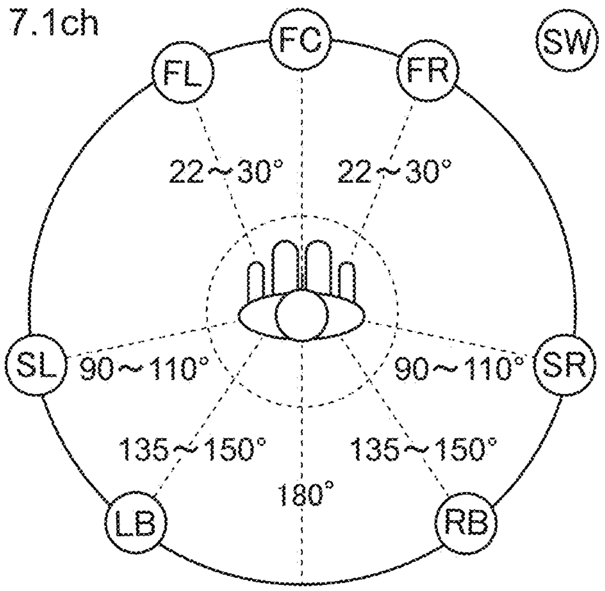

In those formats, the configuration shown in FIG. 11 is recommended as the speaker arrangement, and a content creator allocates the audio signals of respective channels on the assumption of the speaker arrangement. In particular, human voices such as quotes and narrations are generally assigned to the front center channel (FC in FIG. 11) so as to be heard from the front of a listener.

When the multi-channel audio format as described above is used as an input, the remaining signal, excluding the signal of the front center channel, is downmixed and converted into a monaural signal or a stereo signal. Subsequently, the signal having been subjected to low-pass filtering (e.g., cutoff frequency of 500 Hz) is output as a vibration control signal.

As a result, the vibration output section does not vibrate in accordance with a human voice, and the user does not feel an unpleasant vibration.

When downmixing is performed from the 5.1 channel and the 7.1 channel, for example, the following (Equation 5) and (Equation 6) are used, respectively.

$$VM(t)=\alpha FL(t)+\beta FR(t)+\gamma SL(t)+\delta SR(t)+\varepsilon SW(t) \quad \text{(Equation 5)}$$

$$VM(t)=\alpha FL(t)+\beta FR(t)+\gamma SL(t)+\delta SR(t)+\varepsilon SW(t)+\theta LB(t)+\mu RB(t) \quad \text{(Equation 6)}$$

Here, VM(t) is a value at the time t of the vibration signal, and FL(t), FR(t), SL(t), SR(t), SW(t), LB(t), and RB(t) are values at the time t of the audio signals corresponding to FL, FR, SL, SR, SW, LB, and RB of the speaker arrangement, respectively. In addition, $\alpha$, $\beta$, $\gamma$, $\delta$, $\varepsilon$, $\theta$, and $\mu$ are downmix coefficients in the respective signals.

The downmix coefficient may be any numerical value, or each coefficient may be set to, for example, 0.2 in the case of (Equation 5) and 0.143 in the case of (Equation 6) by equally dividing all channels.

In this embodiment, as described above, the signal obtained after removing or reducing the signal of the front center channel of the multi-channel audio signal and downmixing the other channels becomes a vibration signal. This makes it possible to reduce or remove an unpleasant vibration responsive to a human voice during vibration presentation with a multi-channel audio signal being used as an input.

Third Embodiment

The first and second embodiments of the present technology remove or reduce voice in content and maintain the necessary vibration components as much as possible, but they may not be suitable depending on, for example, music content in which a rhythmic feeling is desirably expressed as vibration, or a subjective preference of the user.

In this regard, there is provided a mechanism that allows the user to voluntarily select the implementation of the present technology. In this case, the control of activation/deactivation may be performed by software in a content transmitter (e.g., the external device 60 such as a smartphone, a television, or a game machine), or the control may be performed with an operation unit such as a hardware switch or button (not shown) provided to the casing 254 of the speaker apparatus 100.

A function of adjusting the degree of voice reduction may be provided in addition to the control of activation/deactivation. Equation (7) below shows an equation in which the degree of voice reduction is adjusted with respect to (Equation 4). (Equation 8) for (5.1 channel) and (Equation 9) for (7.1 channel) show the case of the multi-channel audio signals.

$$VM(t)=AL(t)-AR(t)\times\text{Coeff} \qquad \text{(Equation 7)}$$

$$VM(t)=\alpha FL(t)+\beta FR(t)+\gamma SL(t)+\delta SR(t)+\varepsilon SW(t)+FC(t)\times\text{Coeff} \qquad \text{(Equation 8)}$$

$$VM(t)=\alpha FL(t)+\beta FR(t)+\gamma SL(t)+\delta SR(t)+\varepsilon SW(t)+\theta LB(t)+\mu RB(t)+FC(t)\times\text{Coeff} \qquad \text{(Equation 9)}$$

Here, Coeff is a voice reduction coefficient and takes a positive real number of 1.0 or less. As Coeff becomes closer to 1.0, the voice reduction effect becomes better, and as Coeff becomes closer to 0, the voice reduction effect is reduced.

In this embodiment, such an adjustment function is provided, so that the user can freely adjust the degree of voice reduction (i.e., the degree of vibration) in accordance with the user's own preference.

The coefficients Coeff of (Equation 7), (Equation 8), and (Equation 9) are adjusted by the user in the external device 60. The adjusted coefficient Coeff is input from the external device 60 to the subtraction section 93 (see FIG. 9).

In the subtraction section 93, the difference processing of the audio signal according to (Equation 7), (Equation 8), and (Equation 9) is performed in response to the number of input channels.

Fourth Embodiment

In the above description, an embodiment has been described in which the vibration signal is generated from the audio signal to present the vibration to the user. In this embodiment, a case where a vibration signal independent of an audio signal is included as a configuration of future content will be described.

Figure 12:
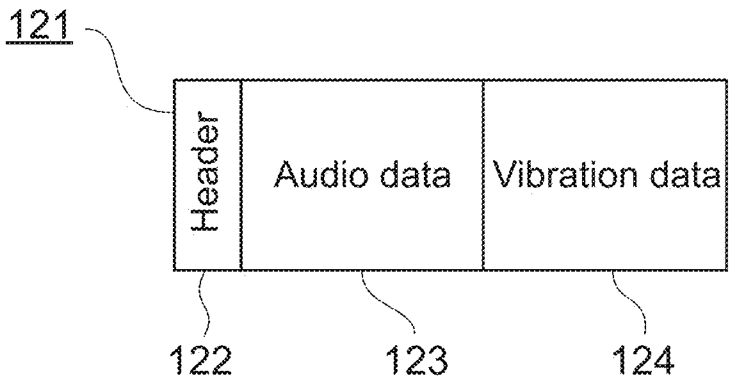
FIG. 12 is a schematic diagram showing stream data in a predetermined period of time relating to sound and vibration.

FIG. 12 is a schematic diagram showing stream data in a predetermined period of time (e.g., several milliseconds) relating to sound and vibration.

Such stream data 121 includes a header 122, audio data 123, and vibration data 124. The stream data 121 may include video data.

The header 122 stores information about the entire frame, such as a sync word for recognizing the top of the stream, the overall data size, and information representing the data type. Each of the audio data 123 and the vibration data 124 is stored after the header 122. The audio data 123 and the vibration data 124 are transmitted to the speaker apparatus 100 over time.

Here, as an example, it is assumed that the audio data is left and right two-channel audio signals and that the vibration data is four-channel vibration signals.

For example, voice sounds, sound effects, background sounds, and rhythms are set for those four channels. Each part such as a vocal, base, guitar, or drum of a music band may be set.

Figure 13:
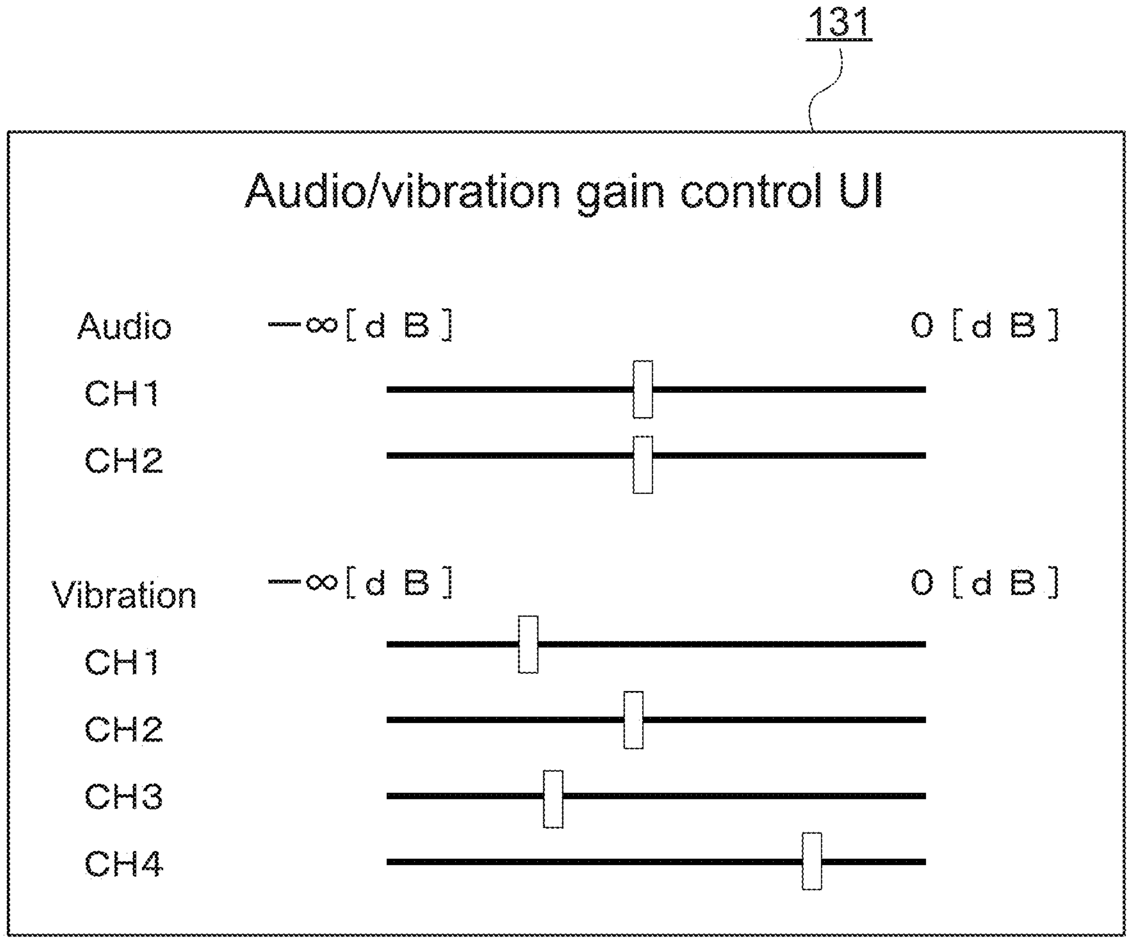
FIG. 13 is a schematic diagram showing user interface software for controlling the gain of audio/vibration signals.

The external device 60 is provided with user interface software (UI or GUI (external operation input section)) 131 for controlling the gain of audio/vibration signals (see FIG. 13). The user operates a control tool (e.g., slider) displayed on the screen to control the signal gain of each channel of the audio/signals.

Thus, the gain of the channel corresponding to the vibration signal that the user feels unfavorable among the output vibration signals is reduced, and thus the user can reduce or remove an unpleasant vibration according to the user's own preference.

As described above, in this embodiment, when the audio signal and the vibration signal are independently received, a channel, by which vibration is not desired to be provided, among the vibration signal channels used for vibration presentation, is controlled on the user interface, thereby muting or reducing the vibration. This allows the user to reduce or remove an unpleasant vibration in accordance with the user's own preference.

<Other Technologies>

In the first embodiment described above, the description has been made with respect to the two-channel stereo sound that is most frequently used in the existing content, but it is also conceivable that the content of one-channel monaural sound is processed in some cases.

In this case, since the difference processing of the left and right channels is impossible, it is conceivable that the component of a human voice is estimated and removed. For example, a technique of separating a monaural channel sound source may be used. Specifically, a non-negative matrix factorization (NMF) and a robust principal component analysis (RPCA) are used. Using those techniques, the signal component of the human voice is estimated, and the estimated signal component is subtracted from VM(t) in Equation 1 to reduce the vibration resulting from the voice.

Note that the present technology may also take the following configurations.

(1) A control apparatus, including:
- an audio control section that generates audio control signals of a plurality of channels with audio signals of the plurality of channels as input signals, the audio signals each including a first audio component and a second audio component different from the first audio component; and
- a vibration control section that generates a vibration control signal for vibration presentation by taking a difference between audio signals of two channels among the plurality of channels.

(2) The control apparatus according to (1), in which
- the vibration control section limits a band of the audio signals of the plurality of channels or a difference signal of the audio signals of the plurality of channels to a first frequency or less.

(3) The control apparatus according to (2), in which
- the vibration control section outputs, as the vibration control signal,
  - a monaural signal obtained by mixing the audio signals of the respective channels for an audio signal having a frequency equal to or lower than a second frequency lower than the first frequency among the audio signals of the plurality of channels, and the difference signal for an audio signal exceeding the second frequency and being equal to or lower than the first frequency among the audio signals of the plurality of channels.

(4) The control apparatus according to (2) or (3), in which the first frequency is 500 Hz or less.

(5) The control apparatus according to (3), in which the second cutoff frequency is 150 Hz or less.

(6) The control apparatus according to any one of (1) to (5), in which the first audio component is a voice sound.

(7) The control apparatus according to any one of (1) to (6), in which the second audio component is a sound effect and a background sound.

(8) The control apparatus according to any one of (1) to (7), in which the audio signals of the two channels are audio signals of left and right channels.

(9) The control apparatus according to any one of (1) to (8), in which the vibration control section includes an adjustment section that adjusts a gain of the vibration control signal on the basis of an external signal.

(10) The control apparatus according to (9), in which the adjustment section is configured to be capable of switching between activation and deactivation of generation of the vibration control signal.

(11) The control apparatus according to any one of (1) to (9), in which the vibration control section includes an addition section that generates a monaural signal obtained by mixing the audio signals of the two channels.

(12) The control apparatus according to any one of (1) to (11), in which the vibration control section includes a subtraction section that takes a difference between the audio signals, and the subtraction section is configured to be capable of adjusting a degree of reduction of the difference.

(13) A signal processing method, including: generating audio control signals of a plurality of channels with audio signals of the plurality of channels as input signals, the audio signals each including a first audio component and a second audio component different from the first audio component; and generating a vibration control signal for vibration presentation by taking a difference between audio signals of two channels among the plurality of channels.

(14) A speaker apparatus, including: an audio output unit; a vibration output unit; an audio control section that generates audio control signals of a plurality of channels with audio signals of the plurality of channels as input signals, the audio signals each including a first audio component and a second audio component different from the first audio component, and drives the audio output unit; and a vibration control section that generates a vibration control signal for vibration presentation by taking a difference between audio signals of two channels among the plurality of channels, and drives the vibration output unit.

REFERENCE SIGNS LIST

1 control apparatus
10 external network
11 storage
12 decoding section
13 audio control section
14 tactile (vibration) control section
15 audio output section
16 tactile (vibration) output section
20, 22 speaker section
21 oscillator
60 external device
80 tactile presentation apparatus
100, 200, 300 speaker apparatus
100C coupler
100L left speaker
100R right speaker
250 audio output unit
251 tactile (vibration) presentation unit

The invention claimed is:

1. A control apparatus, comprising: processing circuitry configured to: generate audio control signals of a plurality of channels with audio signals of the plurality of channels as input signals, the audio signals each including a first audio component and a second audio component different from the first audio component; and generate a vibration control signal for vibration presentation by taking a difference between audio signals of two channels among the plurality of channels.

2. The control apparatus according to claim 1, wherein the processing circuitry is configured to limit a band of the audio signals of the plurality of channels or a difference signal of the audio signals of the plurality of channels to a first frequency or less.

3. The control apparatus according to claim 2, wherein the processing circuitry is configured to output, as the vibration control signal, a monaural signal obtained by mixing the audio signals of the respective channels for an audio signal having a frequency equal to or lower than a second frequency lower than the first frequency among the audio signals of the plurality of channels, and the difference signal for an audio signal exceeding the second frequency and being equal to or lower than the first frequency among the audio signals of the plurality of channels.

4. The control apparatus according to claim 2, wherein the first frequency is 500 Hz or less.

5. The control apparatus according to claim 3, wherein the second frequency is 150 Hz or less.

6. The control apparatus according to claim 1, wherein the first audio component is a voice sound.

7. The control apparatus according to claim 1, wherein the second audio component is a sound effect and a background sound.

8. The control apparatus according to claim 1, wherein the audio signals of the two channels are audio signals of left and right channels.

9. The control apparatus according to claim 1, wherein the processing circuitry is configured to adjust a gain of the vibration control signal on a basis of an external signal.

10. The control apparatus according to claim 9, wherein the processing circuitry is configured to be capable of switching between activation and deactivation of generation of the vibration control signal.

11. The control apparatus according to claim 1, wherein the processing circuitry is configured to generate a monaural signal obtained by mixing the audio signals of the two channels.

12. The control apparatus according to claim 1, wherein the processing circuitry is configured to take a difference between the audio signals, and to be capable of adjusting a degree of reduction of the difference.

13. A signal processing method executed by processing circuitry, the method comprising:

generating audio control signals of a plurality of channels with audio signals of the plurality of channels as input signals, the audio signals each including a first audio component and a second audio component different from the first audio component; and generating a vibration control signal for vibration presentation by taking a difference between audio signals of two channels among the plurality of channels.

14. A speaker apparatus, comprising:

an audio output device;

a vibration output device; and processing circuitry configured to:

generate audio control signals of a plurality of channels with audio signals of the plurality of channels as input signals, the audio signals each including a first audio component and a second audio component different from the first audio component, and to drive the audio output device; and generate a vibration control signal for vibration presentation by taking a difference between audio signals of two channels among the plurality of channels, and to drive the vibration output device.

* * * * *